US009091537B2

(12) United States Patent
Farr et al.

(10) Patent No.: US 9,091,537 B2
(45) Date of Patent: Jul. 28, 2015

(54) TIRE PRESSURE MONITOR SYSTEM TOOL WITH ACTIVE TIRE PRESSURE DISPLAY

(75) Inventors: Scott Allen Farr, Pell City, AL (US); William W. Wittliff, III, Gobles, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 0 days.

(21) Appl. No.: 13/449,930

(22) Filed: Apr. 18, 2012

(65) Prior Publication Data
US 2013/0282231 A1 Oct. 24, 2013

(51) Int. Cl.
| G06F 11/30 | (2006.01) |
| G06C 5/00 | (2006.01) |
| G01M 17/00 | (2006.01) |
| G06F 7/00 | (2006.01) |
| G06F 19/00 | (2011.01) |
| G01B 11/275 | (2006.01) |
| B60C 23/00 | (2006.01) |
| B60C 23/04 | (2006.01) |

(52) U.S. Cl.
CPC ............ *G01B 11/2755* (2013.01); *B60C 23/00* (2013.01); *B60C 23/0479* (2013.01); *G06F 7/00* (2013.01)

(58) Field of Classification Search
CPC ....... G06F 7/00; B60C 23/0479; B60C 23/00; G01B 11/2755
USPC .................. 701/34.4, 1; 340/438; 356/139.09
See application file for complete search history.

(56) References Cited

U.S. PATENT DOCUMENTS

| 5,124,410 A | 6/1992 | Campbell |
| 5,462,374 A | 10/1995 | Kohno |
| 5,557,268 A | 9/1996 | Hughes et al. |
| 5,562,782 A | 10/1996 | Takahashi |
| 5,562,787 A | 10/1996 | Koch et al. |
| 5,573,611 A | 11/1996 | Koch et al. |
| 5,600,301 A | 2/1997 | Robinson, III |

(Continued)

FOREIGN PATENT DOCUMENTS

| EP | 1092568 | * 2/2006 | ............. B60C 23/04 |
| EP | 1092568 B1 | 2/2006 | |

(Continued)

OTHER PUBLICATIONS

Bartec Auto ID Limited—Activation Tool BXR2000A1, Bartec Auto ID Activation Tool (Sep. 3, 2001).

(Continued)

*Primary Examiner* — Calvin Cheung
*Assistant Examiner* — Paula L Schneider
(74) *Attorney, Agent, or Firm* — Baker & Hostetler LLP

(57) ABSTRACT

A wheel alignment apparatus is capable of automatically obtaining tire pressure information from a plurality of tire pressure monitor systems. The wheel alignment apparatus may include an alignment bay configured to receive a vehicle and an optical system located at an end of the alignment bay and configured to provide an image of wheels of the vehicle. The wheel alignment apparatus may also include a camera configured to receive the image of the wheels of the vehicle and a computer configured to display the image of the wheels of the vehicle and automatically display tire pressure information of the wheels of the vehicle when the vehicle is located within a predetermined proximity of the wheel alignment apparatus.

19 Claims, 5 Drawing Sheets

(56) References Cited

U.S. PATENT DOCUMENTS

| | | |
|---|---|---|
| 5,602,301 A | 2/1997 | Field |
| 5,602,524 A | 2/1997 | Mock et al. |
| 5,663,548 A | 9/1997 | Hayashi et al. |
| 5,731,516 A | 3/1998 | Handfield et al. |
| 5,952,935 A | 9/1999 | Mejia et al. |
| 6,172,609 B1 | 1/2001 | Lu et al. |
| 6,237,234 B1 | 5/2001 | Jackson et al. |
| 6,243,007 B1 | 6/2001 | McLaughlin et al. |
| 6,340,929 B1 | 1/2002 | Katou et al. |
| 6,414,592 B1 | 7/2002 | Dixit et al. |
| 6,438,467 B1 | 8/2002 | Pacsai |
| 6,441,727 B1 | 8/2002 | LeMense |
| 6,507,276 B1 | 1/2003 | Young et al. |
| 6,535,116 B1 | 3/2003 | Zhou |
| 6,580,364 B1 | 6/2003 | Munch et al. |
| 6,617,962 B1 | 9/2003 | Horwitz et al. |
| 6,630,885 B2 | 10/2003 | Hardman et al. |
| 6,662,642 B2 | 12/2003 | Breed et al. |
| 6,804,999 B2 | 10/2004 | Okubo |
| 6,864,785 B2 | 3/2005 | Marguet et al. |
| 6,904,796 B2 | 6/2005 | Pascai et al. |
| 6,945,087 B2 | 9/2005 | Porter et al. |
| 6,982,635 B2 | 1/2006 | Obradovich |
| 6,982,653 B2 * | 1/2006 | Voeller et al. ............... 340/933 |
| 6,989,741 B2 | 1/2006 | Kenny et al. |
| 7,053,761 B2 | 5/2006 | Schofield et al. |
| 7,075,421 B1 | 7/2006 | Tuttle |
| 7,104,438 B2 | 9/2006 | Benedict |
| 7,161,476 B2 | 1/2007 | Hardman et al. |
| 7,171,345 B2 | 1/2007 | Mocek |
| 7,319,848 B2 | 1/2008 | Obradovich et al. |
| 7,358,852 B2 | 4/2008 | Nantz et al. |
| 7,359,775 B2 | 4/2008 | Strege et al. |
| 7,592,903 B2 | 9/2009 | Kochie |
| 7,592,904 B2 | 9/2009 | Kochie et al. |
| 7,623,025 B2 | 11/2009 | Miller |
| 7,639,122 B2 | 12/2009 | Kochie et al. |
| 7,648,062 B2 | 1/2010 | Corniot |
| 7,688,192 B2 | 3/2010 | Kenny et al. |
| 7,884,707 B2 | 2/2011 | Wittliff et al. |
| 2002/0130771 A1 | 9/2002 | Osborne et al. |
| 2003/0080862 A1 | 5/2003 | Kranz |
| 2004/0039577 A1 | 2/2004 | Roan et al. |
| 2008/0103718 A1 * | 5/2008 | Miller ............... 702/108 |
| 2008/0278288 A1 | 11/2008 | O'Brien |
| 2010/0262335 A1 * | 10/2010 | Brozovich ............... 701/33 |
| 2012/0010851 A1 | 1/2012 | Mintz et al. |

FOREIGN PATENT DOCUMENTS

| | | |
|---|---|---|
| EP | 1026015 B1 | 5/2006 |
| GB | 2305074 A | 3/1997 |
| GB | 2308947 A | 7/1997 |
| WO | 0025271 A1 | 5/2000 |
| WO | 2005116603 A1 | 12/2005 |

OTHER PUBLICATIONS

Bartec Auto ID Limited—BXR LHF-2000 User Manual, Bartec Auto ID—BXR LHF 2000—Range of Rugged Hand Held TPMS Readers (Aug. 2002).

"Multi Standard Reader Product Range—Overview of Product Range," id Systems, Ltd. (undated).

"Market demands RF/ID standardization," id Systems, Ltd. (undated).

International Search Report and Written Opinion for PCT/US2013/036550 Filed Apr. 15, 2013.

* cited by examiner

TIRE PRESSURE MONITOR SYSTEM TOOL WITH ACTIVE TIRE PRESSURE DISPLAY

FIELD OF THE INVENTION

The invention relates generally to a wheel alignment apparatus. More particularly, the invention relates to a wheel alignment apparatus capable of automatically displaying tire pressure.

BACKGROUND OF THE DISCLOSURE

Systems have been developed to monitor, for example, vehicle tire pressure, and to report the tire pressure to a receiver at a central monitoring station using radio transmissions. A typical remote automotive tire pressure monitoring system includes a plurality of tire-based sensory transmitters and a central, vehicle-based arrangement. The sensory transmitters include a component that senses a tire condition, such as tire pressure or tire temperature. Each transmitter is capable of outputting a coded transmission that conveys sensed tire condition information and an identifier for reception by the vehicle-based arrangement. Within the vehicle-based arrangement, an electronic control unit ("ECU") processes the conveyed information and controls provision of information regarding the sensed tire conditions to a vehicle operator.

During assembly and routine maintenance such as tire rotation or tire replacement, the tire pressure monitoring system must be calibrated. Calibration involves associating the various tire positions with the pressure transmitters that are located on the tires. One proposed method for calibrating a system uses a magnet device to initiate the calibration. In this system, an internal vehicle display panel with locations corresponding to the tire location is activated. When the tire locations are illuminated on the display, the vehicle operator or service technician places the magnet near the indicated tire. The transmitter then sends a code corresponding thereto to the central controller. When the indicator indicates another tire location, the magnet must be brought near each tire location until each of the tire locations have a tire registered thereto. One problem with this device is that a separate component such as a magnet must be provided to the vehicle operator that is used only in the calibration process. One problem associated with a separate magnet device is that such a device is subject to loss. Thus, the tire pressure monitoring system would be rendered inoperable.

There is a need for a tire pressure monitoring system that conveniently provide tire pressure information to a technician during assembly and routine maintenance of tires. Also, there is a need for a tire pressure monitoring system that efficiently provide tire pressure information to a technician in order to reduce amount of time for maintenance of tires.

SUMMARY OF THE DISCLOSURE

In accordance with one embodiment of the present disclosure, a wheel alignment apparatus is provided that may automatically provide tire pressure information when a vehicle is located in an alignment bay. The wheel alignment apparatus may comprise an alignment bay configured to receive a vehicle and an optical system located at an end of the alignment bay and configured to provide an image of wheels of the vehicle. The wheel alignment apparatus may also comprise a camera configured to receive the image of the wheels of the vehicle and a computer configured to display the image of the wheels of the vehicle and automatically display tire pressure information of the wheels of the vehicle when the vehicle is located within a predetermined proximity of the wheel alignment apparatus.

In accordance with another embodiment of the present disclosure, a method is provided for automatically obtaining tire pressure information from a vehicle. The method may comprise storing vehicle data of a plurality types of vehicles in a storing module of a memory and receiving, with a processor, vehicle data based at least in part on a detection of the vehicle within a communication range of a wheel alignment apparatus. The method may also comprise accessing, with the processor, the storing module to determine whether the received vehicle data is stored in the storing module and determining, with the processor, a procedure to automatically obtain information from a tire pressure monitor system installed on the vehicle that is within a communication range based at least in part on a determination that the received vehicle data is stored in the storing module. The method may further comprise receiving, with a controller, the information from the tire pressure monitor system installed on the vehicle that is within the communication range based at least in part on the procedure.

In accordance with one embodiment of the present disclosure, a wheel alignment apparatus is provided that may automatically provide tire pressure information when a vehicle is located within an alignment bay. The wheel alignment apparatus may comprise means for receiving configured to receive a vehicle and means for imaging configured to capture an image of wheels of the vehicle. The wheel alignment apparatus may also comprise means for capturing configured to receive the image of the wheels of the vehicle and means for processing configured to display the image of the wheels of the vehicle and automatically display tire pressure information of the wheels of the vehicle when the vehicle is located within a predetermined proximity of the wheel alignment apparatus.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. For example, although the invention is described in terms of a plurality of modules, it is to be understood that the invention may be implemented using one or more modules. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF EMBODIMENTS

Figure 1:
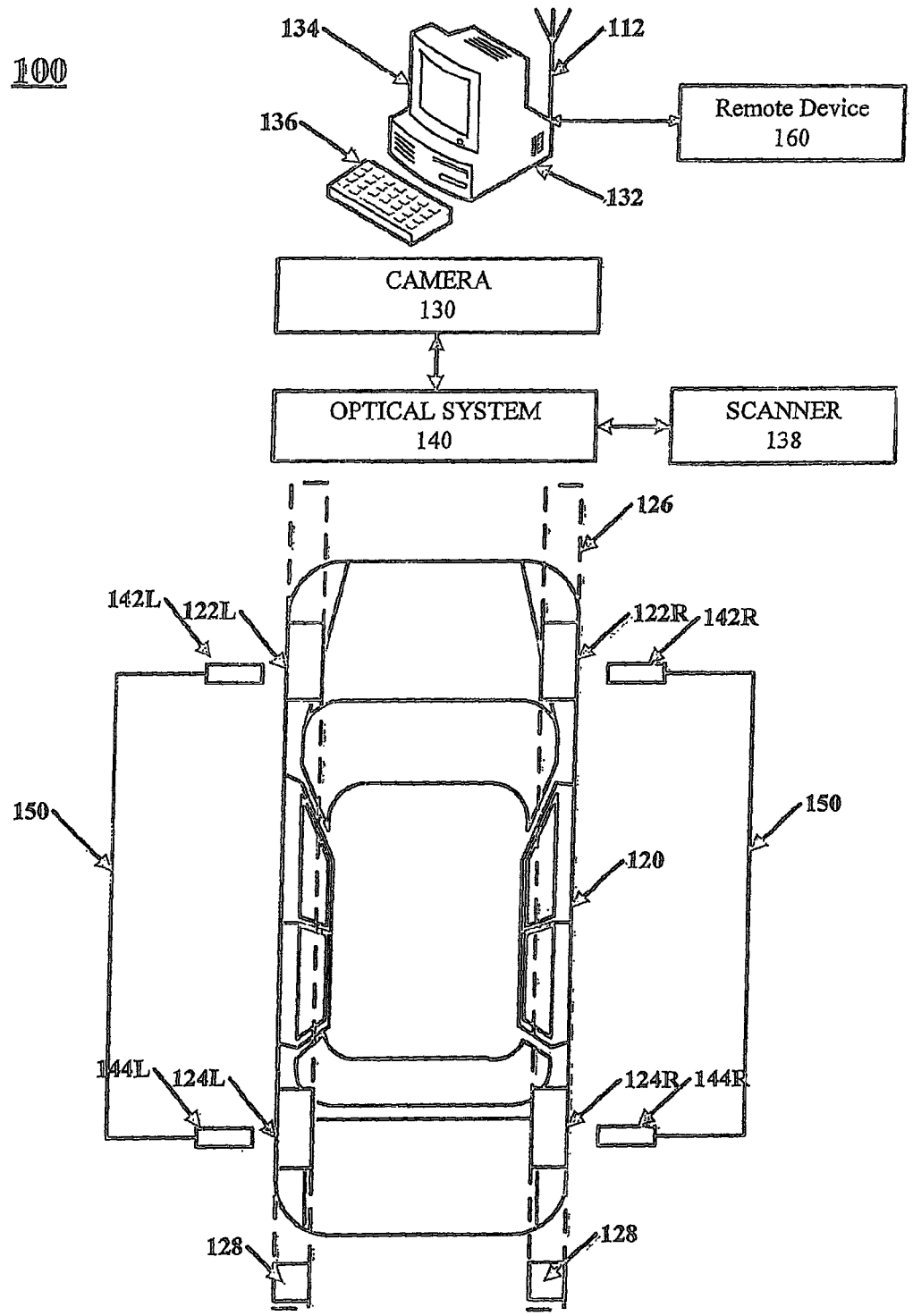
FIG. 1 illustrates a wheel alignment apparatus according to an exemplary embodiment of the present disclosure.

FIG. 1 illustrates a wheel alignment apparatus 100 according to an exemplary embodiment of the present disclosure. A user may perform a wheel alignment of a vehicle 120 using the wheel alignment apparatus 100. The vehicle 120 may include a left front wheel 122L, a right front wheel 122R, a left rear wheel 124L and a right rear wheel 124R. The vehicle 120 may be driven onto an alignment bay 126 of the wheel alignment apparatus 100 in order to perform a wheel alignment operation. The wheel alignment apparatus 100 may also comprise a video camera 130 coupled to a computer 132 that may comprise an antenna 112, a display 134 and an input device 136. The wheel alignment apparatus 100 may further comprise a sensor activation system 150. The sensor activation system 150 may comprise a left front activation sensor 142L, a right front activation sensor 142R, a left rear activation sensor 144L and a right rear activation sensor 144R. The plurality of activation sensors of the sensor activation system 150 may be communicatively coupled to each other with the computer 132 via a wire and/or a wireless link. The wheel alignment apparatus 100 may comprise a remote device 160 that may communicate with the computer 132.

The display 134 may include a computer monitor or any other display device that may display information to a user of the wheel alignment apparatus 100. The display 134 may be used to display information to the user regarding, for example, operational information of the wheel alignment apparatus 100, a tire pressure monitor system (TPMS) of a vehicle or status information regarding an alignment operation of the wheel alignment apparatus 100. The input device 136 may include a keyboard, a mouse, a touch screen, or any other input device that may allow the user to input information into the wheel alignment apparatus 100. The input device 136 may also comprise one or more selector buttons that may be used to navigate through the graphical user interface (GUI) presented on the display 134 and select that certain functions be performed. The selector buttons may be, for example, up and down arrows, an enter function, a menu function, start, activate, and next operations, yes, no, okay, redo, and stop functions, and reuse or new functions.

The video camera 130 may provide an image of the wheels 122L, 122R, 124L and 124R of the vehicle 120 via an optical system 140. For example, the optical system 140 may comprise a plurality of optical elements that may enable the video camera 130 to provide an image of the wheels 122L, 122R, 124L and 124R of the vehicle 120. In an exemplary embodiment, the optical system 140 may comprise a plurality of optical lenses, beam splitters, mirrors or prisms configured to provide an image of wheels 122L, 122R, 124L and 124R of the vehicle 120. The wheel alignment apparatus 100 may comprise the antenna 112 that may be used to transmit signals and receive signals from the wheel alignment apparatus 100 to an electronic control unit (ECU) of the vehicle 120 and a tire pressure sensor mounted, for example, on a rim or wheel of the vehicle.

The wheel alignment apparatus 100 may comprise a scanner 138 that may be communicatively coupled to the computer 132 in order to provide vehicle and tire pressure information to the computer 132. The scanner 138 may be a bar code scanner, a radio frequency identification (RFID) scanner, an infrared (IR) scanner and/or any other scanner that may identify vehicle information. The scanner 118 may allow the user to scan the VIN (vehicle identification number) of the vehicle 120 as the vehicle 120 is driven onto the alignment bay 126. The user may swipe or aim the scanner 138 onto a code that is associated with the vehicle on the alignment bay 126 and read the code accordingly. The code may be affixed to the vehicle 120 at the time of manufacture, purchase, shipment or service. The vehicle identification information may be identified based at least in part on the code affixed to the vehicle 120. For example, the vehicle identification information may include the make, model, year, manufacturer, serial number, date of production or shipment, previous alignment results, electrical specifications, communication protocols, monitoring specifications, control module specification, maintenance information, lot number, warranty information, a manufacture data code, method of shipment and the like.

The activation sensor system 150 may be located on or adjacent to the alignment bay 126 and near the respective wheels in order to activate the tire pressure sensors when the vehicle 120 is driven onto the alignment bay 126. The activation sensor system 150 may communicate with the remote device 160 via a wire and/or a wireless link. Also, the activation sensor system 150 may be mobile and rotatable in order to be placed near the respective wheels in order to activate the tire pressure sensors when the vehicle 120 is driven onto the alignment bay 126. The activation sensor system 150 may activate the tire pressure sensor located on the wheels and/or and an electronic control unit (ECU) of the vehicle 120 and provide the tire pressure information to the computer 132 and/or the remote device 160. The computer 132 and/or the remote device 160 may display the tire pressure information for the technician. The activation sensor system 150 may activate the tire pressure sensors and/or the electronic control unit (ECU) via a plurality of protocols depending on the vehicle 120. For example, the activation sensor system 150 may comprise a magnet, a transceiver (e.g., transmitting an activation signal at a predetermined frequency) and/or other means to activate the tire pressure sensor mounted on the wheels of the vehicle 120. Also, the activation sensor system 150 may communicate with the tire pressure sensors and/or the electronic control unit (ECU) via various communication protocols, such as CAN (ISO 11898), GM 80/160Baud, GM 8192 ALDL, Chrysler SCI, KOEO (Ford), KOER (Ford), DCL (Ford), ISO 9141, J1850 VPW, J1850 PWM, and J1708.

The remote device 160 may be comprise any computing device, a mobile device, a telecommunication device, a cellular phone, a smart phone, a vehicle diagnostic device and/or other devices that may provide vehicle information to the technician. The remote device 160 may be an intermediary device between the activation sensor system 150 and the computer 132 by transferring information between the activation sensor system 150 and the computer 132. Also, the remote device 160 may directly communicate with the tire pressure sensors and/or the electronic control unit (ECU) via various communication protocols, such as CAN (ISO 11898), GM 80/160Baud, GM 8192 ALDL, Chrysler SCI, KOEO (Ford), KOER (Ford), DCL (Ford), ISO 9141, J1850 VPW, J1850 PWM, J1708, and/or other communication protocols of the tire pressure sensors and/or the electronic control unit (ECU). The remote device 160 may transmit vehicle information and tire pressure information to the computer 132 wirelessly (e.g., Wi-Fi communication) obtained from the vehicle 120. The remote device 160 may perform the same function as the computer 132 while allowing technicians to move around the wheel alignment apparatus 100.

Figure 2:
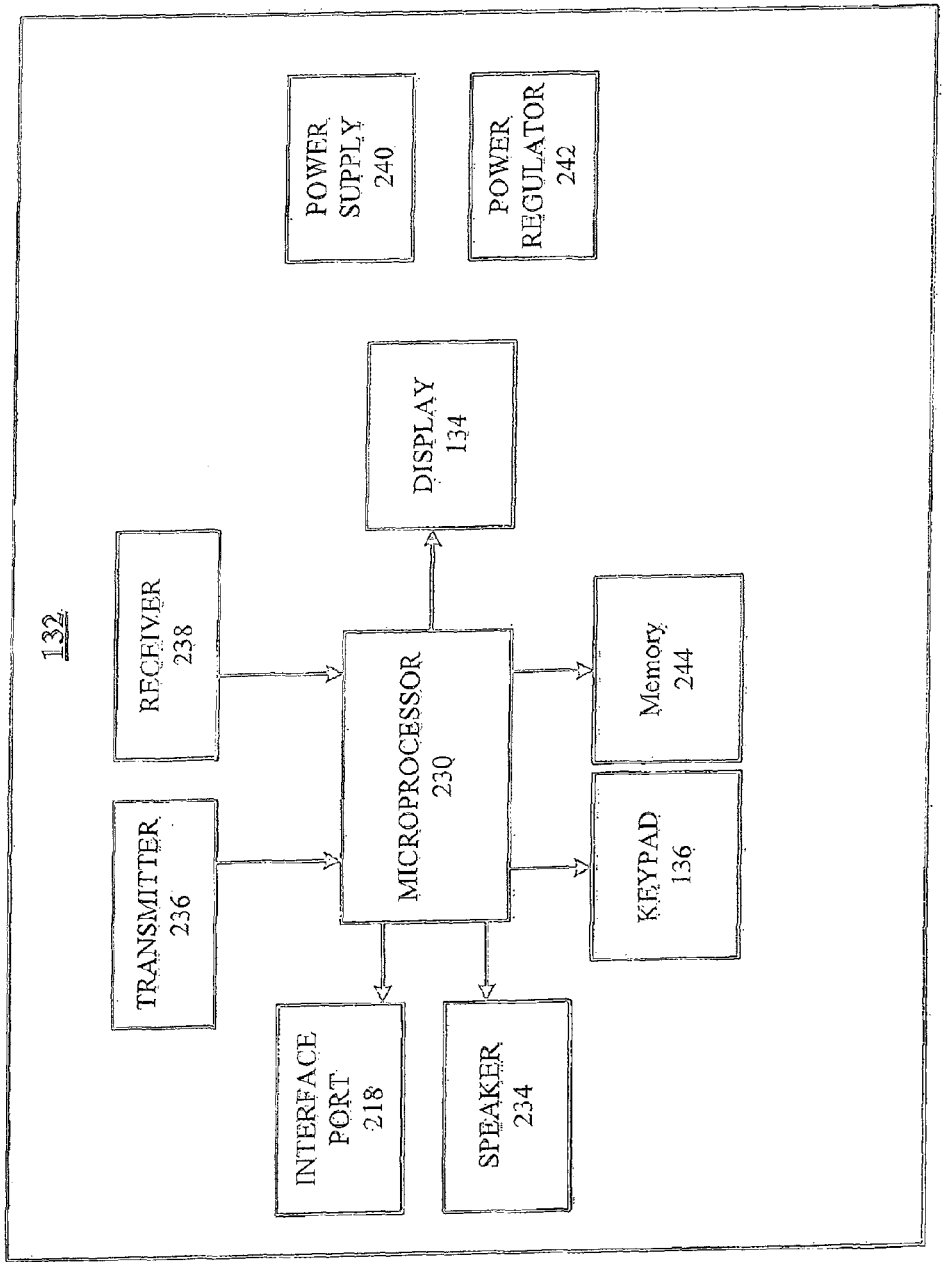
FIG. 2 is a block diagram of components of a computer of a wheel alignment apparatus according to an exemplary embodiment of the present disclosure.

FIG. 2 illustrates a block diagram of components of the computer 132 of the wheel alignment apparatus 100 illustrated in FIG. 1 according to an exemplary embodiment of the present disclosure. The computer 132 may include a microprocessor 230 that processes software used to operate the wheel alignment apparatus 100. The software used to operate the wheel alignment apparatus 100 may be stored on a memory 244. The memory 244 may be, for example, any suitable storage medium such as a storage module on the microprocessor 230, a hard disk, a removable storage media, such as a flash disk for other suitable storage mechanism. The microprocessor 230 may communicate with the memory 244 in order to execute the software used to operate the wheel alignment apparatus 100. The microprocessor 230 communicates with the input device 136 (e.g., keypad). The microprocessor 230 may also be in communication with a speaker 234. The speaker 234 may be used to provide audible tones or notifications during operation of the wheel alignment apparatus 100.

The microprocessor 230 may also be in communication with an interface port 218. The interface port 218 may enable the computer 132 to be coupled to external devices (e.g., computers and mobile devices) and/or networks (e.g., Internet or Intranet). In an exemplary embodiment, the interface port 218 may be, for example, but not limited to, an RS-232 serial port, a universal serial bus (USB) port, Ethernet port, firewire port, IEEE 1394 interface port, parallel port, PS/2 connector port, serial port, video graphics array (VGA) port, direct attached storage (DAS) port, serial advanced technology attachment (SATA) bus port, high-definition multimedia interface (HDMI) port, digital visual interface (DVI) port, digital visual interface port, small computer system interface (SCSI) port, analog signal port and any other ports that may interface the computer 132 to other external devices.

The microprocessor 230 may also be in communication with a transmitter 236 and a receiver 238. The transmitter 236 may be used to transmit signals to a tire pressure sensor mounted on a wheel and an electronic control unit (ECU) of a vehicle. In an exemplary embodiment, the transmitter 236 may periodically transmit search signals to search for a tire pressure sensor mounted on a wheel and an electronic control unit (ECU) of the vehicle when the vehicle is within a transmission or a reception range. After identifying one or more tire pressure sensors mounted on a wheel and the electronic control unit (ECU), the transmitter 236 may transmit inquiry signals to the one or more tire pressure sensors mounted on the wheel of the vehicle or the electronic control unit (ECU) to obtain tire pressure information. For example, a user may input vehicle identification number (e.g., vehicle identification information) into the computer 132 in order to identify specification (e.g., communication protocol of the tire pressure sensor) associated with the one or more tire pressure sensors mounted on the wheel and the electronic control unit (ECU) of a vehicle. Subsequently, the transmitter 236 may transmit inquiry signals based at least in part on the specification associated with the tire pressure sensors mounted on the wheel and the electronic control unit (ECU) of the vehicle. According to an exemplary embodiment of the present disclosure, the transmitter 236 operates at 125 kHz and other frequencies as needed by the user. Although only one transmitter is shown, it is to be understood that multiple transmitters including transmitters of different types may be used.

In another example, the scanner 138 may scan a code associated with the vehicle in order to identify vehicle identification number (e.g., vehicle identification information). For example, the scanner 138 may be initiated by the alignment bay 126 that may comprise one or more sensors 128 (e.g., weight sensors, see FIG. 1) to detect the vehicle 120 when the vehicle 120 is driven onto the alignment bay 126. Upon detection of the vehicle 120 driven onto the alignment bay 126, the computer 132 may provide an initiation signal to the scanner 138 to scan a code associated with the vehicle 120 and pre-initiate the scanner 138 to receive wireless vehicle information. Also, upon detection of the vehicle driven onto the alignment bay 126, the computer 132 may provide an initiation signal to the activation sensor system 150 and/or the remote device 160 to initiate a communication with the vehicle 120 in order to obtain tire pressure information. The scanner 138 may scan the vehicle identification number (e.g., vehicle identification information) and provide the vehicle identification information to the computer 132. The computer 132 may identify specification of tire pressure sensors mounted on the wheel and the relevant electronic control unit (ECU) of the vehicle based at least in part on the vehicle identification information. Subsequently, the transmitter 236 may transmit inquiry signals based at least in part on the specification (e.g., communication protocols) of the tire pressure sensors mounted on the wheel and the electronic control unit (ECU) of the vehicle to obtain tire pressure information.

The receiver 238 may be used to receive signals transmitted from the tire pressure sensor mounted on the wheel and the electronic control unit (ECU) of the vehicle. According to an exemplary embodiment of the present disclosure, the receiver 238 may operate at 315 MHz and have a clock speed of 10.178 MHz. Alternatively, the receiver 238 may operate at 433 MHz and have a clock speed of 13.225 MHz. Although only one receiver is shown, it is to be understood that multiple receivers operating at different frequencies and having different clock speeds may be used.

The wheel alignment apparatus 100 may also include a power supply 240. The power supply may be, for example, the vehicle batteries. Also, the power supply may be an alternating current (AC) or direct current (DC) power supply. The power supply 240 may be in communication with a power regulator 242. The power regulator 42 may be used to regulate the power supplied to each device of the wheel alignment apparatus 100.

Figure 3:
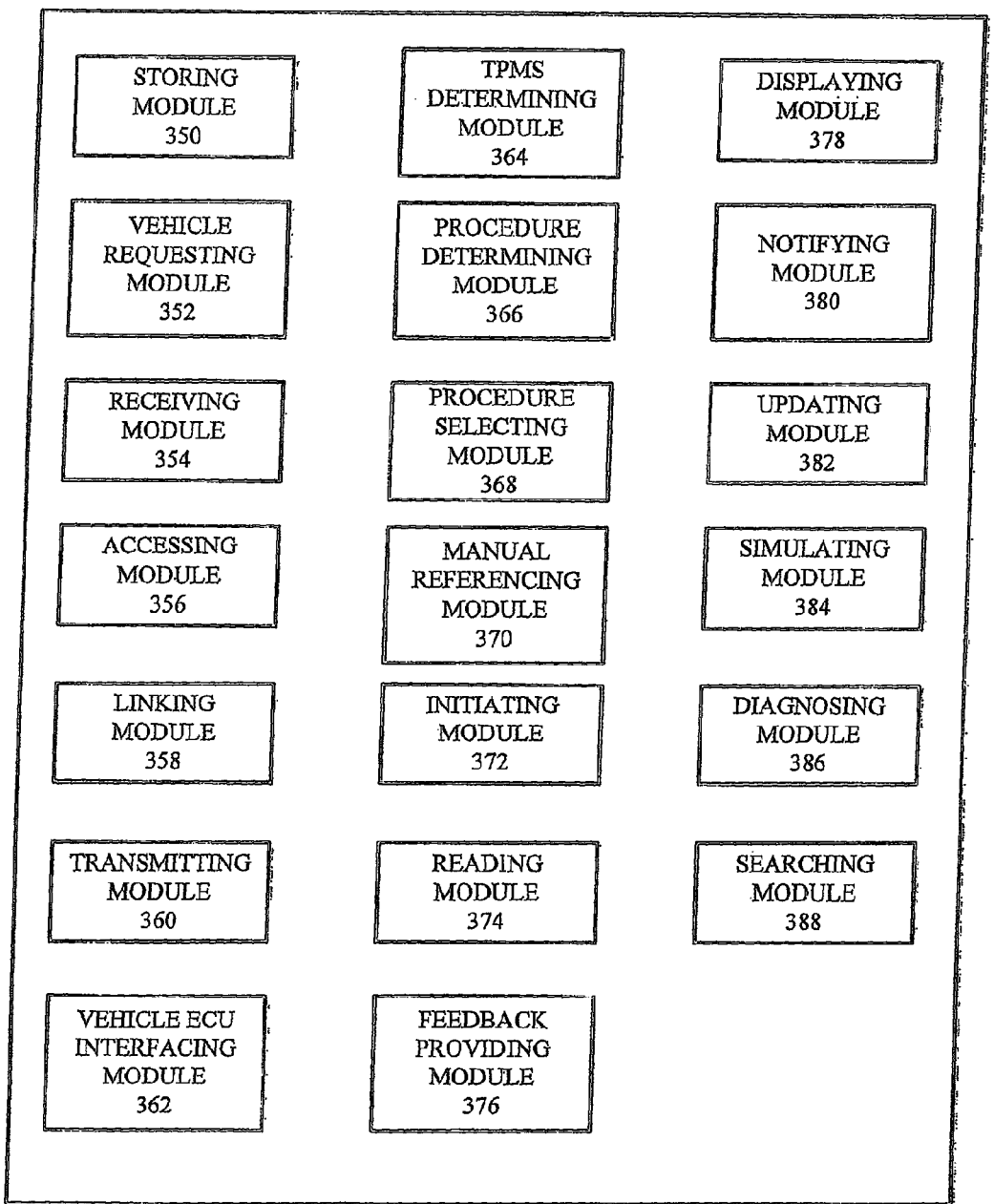
FIG. 3 is a block diagram of modules used with a wheel alignment apparatus according to an exemplary embodiment of the present disclosure.

FIG. 3 illustrates a block diagram of modules used with the wheel alignment apparatus 100 shown in FIG. 1 according to an exemplary embodiment of the present disclosure. The wheel alignment apparatus 100 may include the memory 244 that may store various modules described herein. The wheel alignment apparatus 100 may include a storing module 350 that stores information regarding a plurality of tire pressure monitor systems (TPMS) that may be stored in the memory 244. According to an exemplary embodiment of the present disclosure, the information stored relates to a plurality of tire pressure monitor systems (TPMS) from a variety of vehicle manufactures and various models and years of the vehicles. The information may include tire pressure monitor systems (TPMS) from original equipment manufacturers (OEMs), tire manufacturers, tire pressure monitor systems (TPMS) manufacturers and aftermarket manufacturers. Also, the information may include previous services/alignment performed on the tires and/or tire pressure monitor systems (TPMS) of the vehicle.

The wheel alignment apparatus 100 also includes a vehicle data requesting module 352. The vehicle data requesting module 352 may be used to request data regarding a particular vehicle for which the wheel alignment apparatus 100 may be used to perform wheel alignment. The vehicle data requesting module 352 may prompt and present a user of the wheel alignment apparatus 100 with a plurality of screens displaying information regarding various vehicle types. For example, the user may be presented with the vehicle data associated with the vehicle for which the wheel alignment apparatus 100 was most recently used. According to another embodiment, the user of the wheel alignment apparatus 100 may be prompted by the vehicle data requesting module 352 to input vehicle information. For example, the user may be presented with a series of screens displaying lists of various makes, models, manufacturer, and years of various vehicles. The user may use the input device 136 to navigate the lists and select the make, model, manufacturer and year of a desired vehicle. Also, the user may use the input device 136 to manually input the vehicle data. A receiving module 354 may be used to receive input provided by the user or tire pressure information from tire pressure sensors or electronic control unit (ECU).

In another example, the vehicle data requesting module 352 may provide vehicle data requesting signals to the scanner 138 to obtain vehicle data. For example, the vehicle data requesting signals may cause the scanner 138 to read a code associated with the vehicle 120 to identify vehicle information. The code associated with the vehicle 120 may be a vehicle identification number (VIN). The vehicle data requesting module 352 may identify make, model, manufacturer and year of the vehicle based at least in part on the code associated with the vehicle 120. The receiving module 354 may be used to receive information from the scanner 138.

An accessing module 356 may be used to access the information stored in the storing module 350 to determine whether any of the information stored by the storing module 350 is associated with the vehicle data inputted by the user or detected by the scanner 138. If the storing module 350 does not include any information associated with the received vehicle data, the user may be notified that no information was located. The wheel alignment apparatus 100 may automatically communicate with tire pressure sensor and an electronic control unit (ECU) of the vehicle when the storing module 350 does not include any information associated with the vehicle data using a searching module 388, as described in detail below.

If information associated with the vehicle data is located, however, a linking module 358 may be used to link the information with the vehicle data. The information may include, for example, communication protocols for communicating with an electronic control unit (ECU) of the vehicle, procedures for automatically obtaining tire pressure information from the tire pressure sensors, procedures for aligning the wheels of the vehicle, procedures for resetting a tire pressure monitor system of the vehicle, diagnosing the tire pressure monitor system of the vehicle or other functions. The information may also include past information associated with the vehicle. For example, past information may include previous service/diagnostic performed on the vehicle that may be used to determine current issues. In an exemplary embodiment, past alignment issues of the vehicle may be used to determine current unbalance and/or uneven wear of the tire of the vehicle.

A transmitting module 360 may then be used to transmit a signal from the wheel alignment apparatus 100 to a tire pressure sensor of the vehicle using the transmitter 236. A vehicle electronic control unit (ECU) interfacing module 362 may be used to interface with the vehicle electronic control unit (ECU). The wheel alignment apparatus 100 may interface with the vehicle electronic control unit (ECU) to, for example, automatically read tire pressure information or reset a tire pressure monitor system (TPMS) of the vehicle after receiving vehicle data. This enables the automatic reading of the tire pressure information from the tire pressure monitor system (TPMS) or the vehicle electronic control unit (ECU) such that tire pressure information may be automatically displayed after receiving vehicle data to a user performing, for example, a wheel alignment.

A tire pressure monitor system (TPMS) determining module 364 may be used to determine a type of tire pressure monitor system (TPMS) installed on the vehicle and indirectly the sensor communication protocols of the tire pressure sensor. This information may be obtained, for example, from the vehicle electronic control unit (ECU) or by matching the vehicle data with vehicle data provided in a lookup table stored by the wheel alignment apparatus 100. The vehicle data may be associated with the particular type of tire pressure monitor system (TPMS) installed on the vehicle. Upon determining the tire pressure monitor system (TPMS) installed on the vehicle, a procedure determining module 366 may automatically determine a procedure to be followed to, for example, read, reset or diagnose the tire pressure monitor system of the vehicle. Based on the vehicle data and the procedure requested by the user, a procedure selecting module 368 may select the procedure corresponding to the tire pressure monitor system (TPMS) installed on the vehicle in order to automatically obtain tire pressure information. Some procedures may require a user to perform procedures specific to a vehicle. These procedures are typically located in an owner's manual of the vehicle. Therefore, a manual referencing module 370 may be used to refer to the owner's manual so that the user may perform this procedure prior to continuing to use the wheel alignment apparatus 100.

According to an exemplary embodiment of the present disclosure, an initiating module 372 may be used to automatically initiate one or more tire pressure sensors of a vehicle according to the tire pressure monitor system (TPMS) installed on the vehicle 120. Initiating the tire pressure sensors places the sensors in a state that enables the sensors to communicate with the wheel alignment apparatus 100 and the electronic control unit (ECU) of the vehicle.

After initiating the sensors, the tire pressure monitor system (TPMS) of the vehicle may be, for example, automatically read the tire information using a reading module 374. The reading module 374 may enable the electronic control unit (ECU) of the vehicle to automatically read tire pressure, tire temperature, locations, identification numbers, and other information regarding the tire pressure sensors mounted one or more wheels of the vehicle and receive the same information from the tire sensors directly. The reading module 374 may automatically read tire pressure information from the tire pressure monitor system (TPMS) or the electronic control unit (ECU). According to an exemplary embodiment of the present disclosure, the antenna 112 (e.g., removable from the computer 132) of the wheel alignment apparatus 100 may be placed adjacent a valve stem of a wheel of a vehicle to initiate the tire pressure sensors in order to automatically read tire pressure information. In another exemplary embodiment, the activation sensor system 150 of the wheel alignment apparatus 100 may be located adjacent to a wheel of a vehicle to initiate the tire pressure sensors in order to automatically read tire pressure information. The activation sensor system 150 may transmit the tire pressure information to the receiver 238 and/or the remote device 160 (e.g., Wi-Fi communication link). In other exemplary embodiments, the activation sensor system 150 may transmit the tire pressure information to the receiver 238 via the remote device 160. The wheel alignment apparatus 100 automatically receives, for example, tire pressure information, temperature, location, identification number, and possibly other information from the tire pressure sensor using receiving module 354 and transmits the information to the vehicle electronic control unit (ECU) using transmitting module 360.

A feedback providing module 376 may be used to determine whether the tire pressure monitor system (TPMS) has been read. For example, the feedback providing module 376 may cause symbols, text or other information to be displayed on the display 134 indicating that a read procedure has been completed. The information may be automatically displayed on the display 134 using a displaying module 378. A notifying module 380 may be used to notify the user that a read or other procedure has been completed. For example, the notifying module 380 may cause an electronic control unit (ECU) of a vehicle to sound a horn of the vehicle or flash one or more lights of a vehicle indicating that the read or other procedure has been completed. In another example, the notifying module 380 may cause the wheel alignment apparatus 100 to sound or flash the display 134 to indicate that the read or other procedure has been completed.

An updating module 382 may be used to update the information stored by the storing module 350. The updating module 382 may be in communication with a communication network (e.g., Internet). The updating module 382 may receive information from a computer, the Internet or other data source using, for example, the interface port 218 connected to the communication network and the computer or other device. The updating module 382 may modify information stored by the storing module 350 or add information to the storing module 350. Additional information may be, for example, information relating to tire pressure monitor systems (TPMS) installed on newer vehicles.

The wheel alignment apparatus 100 may also include a simulating module 384. The simulating module 384 may be used to simulate a tire pressure sensor to validate the functionality of a tire pressure monitor system (TPMS) and the electronic control unit (ECU) on a vehicle.

A diagnosing module 386 may also be used to diagnose a tire pressure monitor system (TPMS) on a vehicle. The diagnosing module 386 may be used to obtain, for example, diagnosing information and problems associated the tire pressure monitor system (TPMS) and the relevant electronic control unit (ECU) of the vehicle. For example, the diagnosing module 386 may provide an error code of the tire pressure monitor system (TPMS) and an electronic control unit (ECU) to the user.

A searching module 388 may be used to identify one or more tire sensors mounted on a wheel of a vehicle or a tire pressure monitor system (TPMS) on a vehicle within a transmission range. In an exemplary embodiment, the transmission range of the searching module 388 may be a working area (e.g., alignment bay 126) of a user. For example, the searching module 388 may continuously transmit inquiry signals to identify one or more tire sensors mounted on a wheel of a vehicle or a tire pressure monitor system (TPMS) on a vehicle that are within a transmission range or reception range at certain interval. In an exemplary embodiment, the searching module 388 may transmit the inquiry signals in ten millisecond intervals. In another example, the searching module 388 may transmit inquiry signals to tire pressure monitor system (TPMS) and the relevant electronic control unit (ECU) when the storing module 350 does not include any information associated with the vehicle data. The inquiry signals may also initiate and cause one or more tire sensors mounted on a wheel of a vehicle or a tire pressure monitor system within a transmission range to establish a communication link with the wheel alignment apparatus 100. The one or more tire sensors mounted on a wheel of a vehicle or a tire pressure monitor system (TPMS) may provide a response signal to the receiving module 354 based at least in part on the inquiry signals.

The searching module 388 may provide tire pressure monitoring system (TPMS) information to the accessing module 356 to access the information stored in the storing module 350 to determine whether any of the information stored in the storing module 350 is associated with the vehicle data obtained by the searching module 388. For example, the accessing module 356 may access a second memory or database of the storing module 350, which may include information associated with aftermarket tire pressure monitoring system (TPMS) (e.g., not original equipment manufacturer (OEM)). If information associated with the tire pressure monitoring system (TPMS) is located, a linking module 358 may be used to link the information with the tire pressure monitoring system (TPMS). The information may include, for example, communication protocols for communicating with the relevant electronic control unit (ECU) of the vehicle, procedures for reading the tire pressure, procedures for aligning the wheels of the vehicle, procedures for resetting a tire pressure monitor system of the vehicle, previous service data, diagnosing the tire pressure monitor system of the vehicle or other functions.

As discussed above, the transmitting module 360 may then be used to transmit a signal from the wheel alignment apparatus 100 to a tire pressure sensor of the vehicle or the relevant electronic control unit (ECU) of the vehicle. If the signal is transmitted to the relevant electronic control unit (ECU) of the vehicle, a vehicle electronic control unit (ECU) interfacing module 362 may be used to interface with the vehicle electronic control unit (ECU). The wheel alignment apparatus 100 may interface with the vehicle electronic control unit (ECU) to, for example, automatically read tire pressure information or reset a tire pressure monitor system (TPMS) of the vehicle after receiving vehicle data.

Figure 4A:
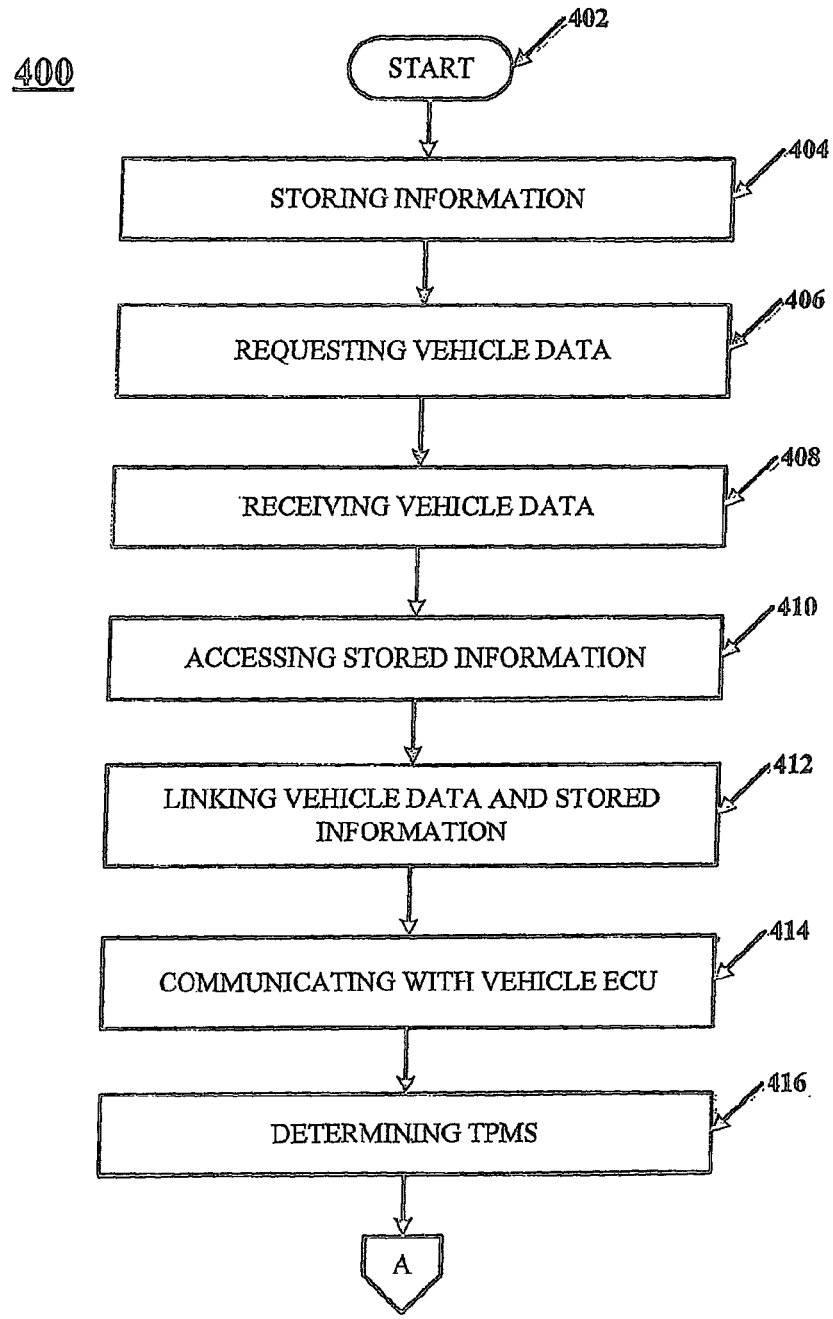
FIGS. 4A-B illustrate a method of communicating with a vehicle tire using the wheel alignment apparatus according to an exemplary embodiment of the present disclosure.
Figure 4B:
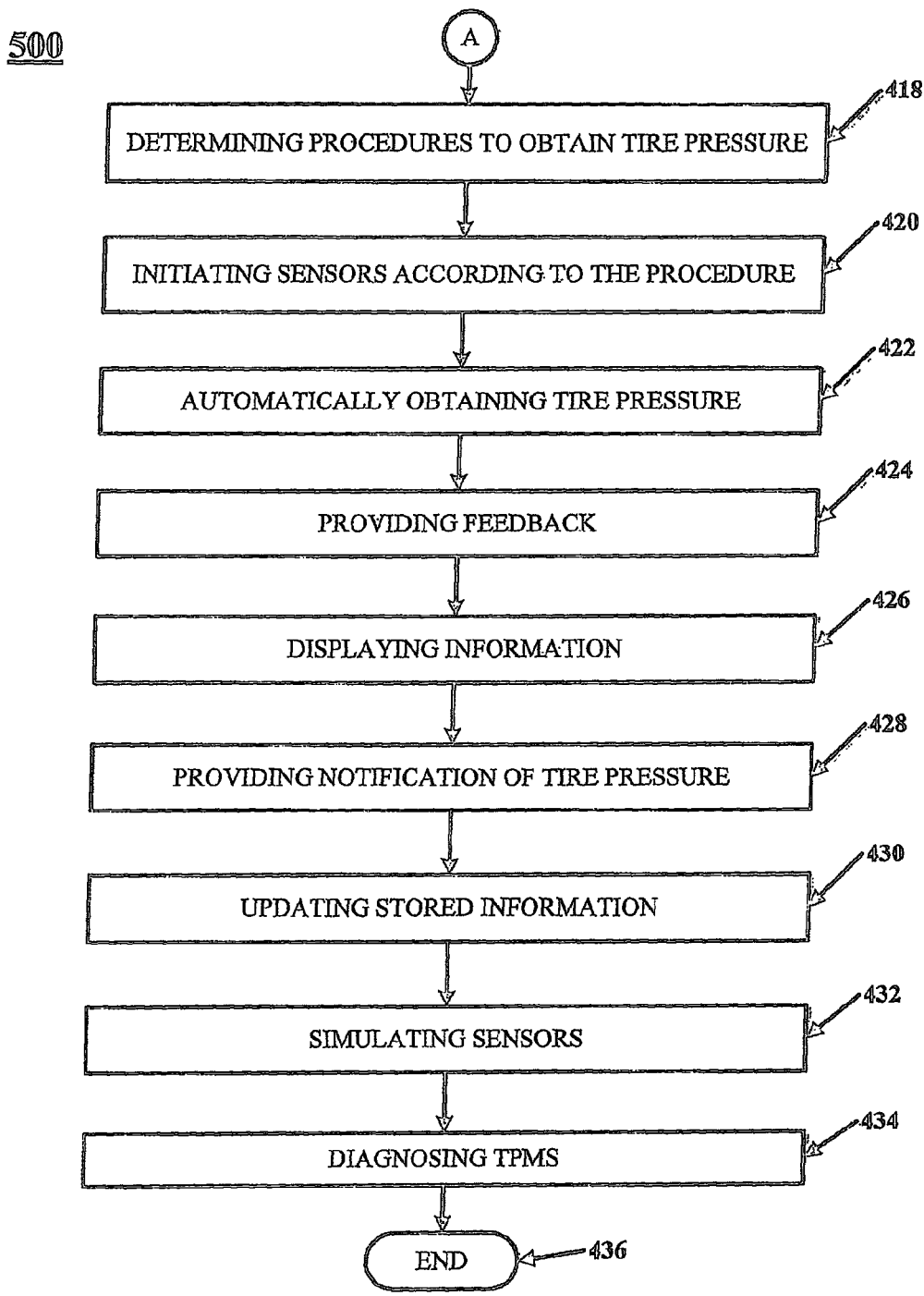

FIGS. 4A-B illustrate a method 400 of communicating with a tire pressure monitor system of a vehicle using the wheel alignment apparatus 100 according to an exemplary embodiment of the present disclosure. The method 400 of communicating with a tire pressure monitor system (TPMS) of a vehicle may begin at step 402. In step 404, information regarding tire pressure monitor systems (TPMS) and vehicle electronic control units (ECU) may be stored by the storing module 350 of the wheel alignment apparatus 100. For example, the storing module 350 in the memory 244 may comprise a first database that stores tire sensor information of the original equipment manufacturer (OEM) tire pressure monitoring system (TPMS) and vehicle electronic control units (ECU) and a second database that stores tire sensor information of the aftermarket tire pressure monitoring system (TPMS) and vehicle electronic control units (ECU). The wheel alignment apparatus 100 may be used to automatically obtain tire pressure information from one or more tire pressure sensors on the wheels when the vehicle is driven on the alignment bay 126 or when the vehicle is driven within a predetermined proximity of the wheel alignment apparatus 100.

To communicate properly with a tire pressure sensor or the relevant vehicle electronic control unit (ECU), the wheel alignment apparatus 100 may be provided with data regarding the vehicle from which tire pressure information is sought. Vehicle data may be requested as illustrated in step 406. The sensor 128 of the alignment bay 126 may sense that a vehicle 120 has driven onto the alignment bay 126. Upon detection of the vehicle 120 on the alignment bay, the vehicle data requesting module 352 may be automatically initiated to request vehicle data. For example, the vehicle data may be requested by, the vehicle data requesting module 352 prompting a user to input vehicle data. Also, the vehicle data may be requested by, the vehicle data requesting module 352 initiating a scanner 138 to obtain vehicle data.

In another exemplary embodiment, the searching module 388 may automatically transmit inquiry signals to identify one or more tire pressure sensors within a communication range of the wheel alignment apparatus 100. The inquiry signals may be transmitted by the transmitter 236 and/or the activation sensor system 150 located adjacent to the wheel of the vehicle. The inquiry signals may initiate one or more tire pressure sensors and/or the electronic control unit (ECU) of a vehicle within the communication range of the wheel alignment apparatus 100 to transmit vehicle data back to the receiving module 354. Vehicle data may include, for example, but not limited to, a make, manufacturer, model, vehicle identification number (YIN) and year of a vehicle.

The wheel alignment apparatus 100 may receive vehicle data in step 408. The receiving module 354 may receive vehicle data from the user input or the scanner 138. Also, the tire pressure sensors and/or the electronic control unit (ECU) of the vehicle may provide vehicle data to the receiving module 354 in response to receiving the inquiry signals. If the vehicle data displayed is not related to the vehicle from which tire pressure information is sought, the wheel alignment apparatus 100 may provide a series of displays to the user enabling the user to select a make, model, manufacturer and year data from among a list of manufacturers, makes, models, and years. The information stored in step 404 is then accessed in step 410 to determine whether tire pressure monitor system information relating to the vehicle data received by the receiving module 354 is stored in the storing module 350. If information relating to the vehicle data is located, this information is linked with the vehicle data in step 412.

The wheel alignment apparatus 100 may use this information to communicate with the relevant electronic control unit (ECU) of the vehicle, in step 414. Based on the communication with the relevant electronic control unit, a determination may be made regarding a tire pressure monitor system (TPMS) installed on the vehicle 120 in step 416. Based on the tire pressure monitor system installed, a determination may be made regarding a procedure to, for example, obtain tire pressure information and reset or diagnose the tire pressure monitor system, in step 418 (shown in FIG. 4B). The procedure may be, for example, activating the tire pressure sensors to transmit tire pressure information to the wheel alignment apparatus 100. Also, the procedure may be, for example, placing the vehicle in a learn mode such that the vehicle or electronic control unit (ECU) is able to receive tire pressure monitor system information from tire pressure sensors provided on one or more wheels of the vehicle.

In step 420, one or more of the tire pressure sensors provided on the wheels of the vehicle may be initiated. Initiating the tire pressure sensors enable the sensors to communicate with the wheel alignment apparatus 100 and/or the vehicle electronic control unit (ECU). Initiating the sensors may be performed by, for example, an antenna 112 and/or the activation sensor system 150 of the wheel alignment apparatus 100 may activate the tire sensors mounted on the wheel of the vehicle. The wheel alignment apparatus 100 may transmit and receive information between the vehicle electronic control unit (ECU) and the tire pressure sensor such that the electronic control unit (ECU) may determine tire pressure, tire temperature, a location, identification number, or other information from the tire pressure sensor. The tire pressure information may be automatically obtained by the wheel alignment apparatus 100 based at least in part on the vehicle data in step 422.

Feedback may be provided to the user to, for example, indicate that a tire pressure sensor has been successfully initiated or that the signal has been received by the wheel alignment apparatus 100 in step 424. This information may be automatically displayed on the display 134 of the wheel alignment apparatus 100 in step 426. The user may also be notified when the tire pressure information is displayed for the viewing of the user in step 428. For example, the wheel alignment apparatus 100 may cause the electronic control unit (ECU) of the vehicle to sound a horn of the vehicle or flash one or more lights of the vehicle indicating that the tire pressure information is ready for viewing by the user.

According to one embodiment of the present disclosure, the wheel alignment apparatus 100 may be updated with modified or additional tire pressure monitor system information in step 430. For example, the computer 132 may be communicatively coupled to the Internet or other data source such that tire pressure monitor system information may be communicated to the wheel alignment apparatus 100 in step 430 and stored in step 404. The tire pressure monitor system information may include modifications or additions to the information already stored by the storing module 350. Also, the tire pressure monitor system information may include original equipment manufacturer (OEM) tire pressure monitor system information and aftermarket tire pressure monitor system information.

The wheel alignment apparatus 100 may also simulate a tire pressure sensor of a vehicle in step 432. The wheel alignment apparatus 100 may simulate the tire pressure sensor to verify the tire pressure information and validate the functionality of a tire pressure monitor system installed on a vehicle. The wheel alignment apparatus 100 may also be used to diagnose the tire pressure monitor system in step 434. The wheel alignment apparatus 100 may be used to automatically obtain information such as tire pressure and sensor identification information. Additionally, the wheel alignment apparatus 100 may obtain information regarding alignment information of the wheels of a vehicle.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A wheel alignment apparatus, comprising:
   an alignment bay configured to receive a vehicle;
   an optical system located at an end of the alignment bay and configured to provide an image of wheels of the vehicle;
   a camera configured to receive the image of the wheels of the vehicle;
   a sensor activation system located on or adjacent to the alignment bay and configured to initiate tire pressure sensors on the vehicle when the vehicle is detected by the alignment bay, the sensor activation system being rotatably placeable near the wheels of the vehicle, the sensor activation system including a plurality of activation sensors on each side of the vehicle, the plurality of activation sensors being communicatively coupled to each other; and a computer including a display configured to display the image of the wheels of the vehicle, the computer configured to automatically obtain information from, and information regarding a type of a tire pressure monitor system installed on the vehicle to automatically display instantaneous tire pressure information of the wheels of the vehicle based upon the information received from the tire pressure sensors and the type of the tire pressure monitor system when the vehicle is located within a predetermined proximity of the wheel alignment apparatus.

2. The wheel alignment apparatus of claim 1, wherein the alignment bay comprises a sensor to detect a presence of the vehicle.

3. The wheel alignment apparatus of claim 2, wherein the alignment bay is further configured to transmit an initiation signal to the computer when the presence of the vehicle is detected.

4. The wheel alignment apparatus of claim 1, further comprising a scanner configured to scan information associated with the vehicle and is communicatively coupled to the computer.

5. The wheel alignment apparatus of claim 4, wherein the scanner is configured to automatically scan information associated with the vehicle when the vehicle is located within the predetermined proximity of the wheel alignment apparatus.

6. The wheel alignment apparatus of claim 4, wherein the information associated with the vehicle comprise at least a vehicle identification number (VIN).

7. The wheel alignment apparatus of claim 1, wherein the sensor activation system is activated when the vehicle is located within the predetermined proximity of the wheel alignment apparatus.

8. The wheel alignment apparatus of claim 1, further comprising:
a remote device configured to communicate with the computer and provide the tire pressure information to the computer.

9. A method for automatically obtaining tire pressure information from a vehicle, comprising the steps of:
storing vehicle data of a plurality types of vehicles in a storing module of a memory;
receiving, with a processor, vehicle data based at least in part on a detection of the vehicle within a communication range of a wheel alignment apparatus;
accessing, with the processor, the storing module to determine whether the received vehicle data is stored in the storing module;
providing a sensor activation system rotatably placeable near wheels of the vehicle;
initiating tire pressure sensors on the vehicle using the sensor activation system coupled to the processor when the vehicle is detected by the wheel alignment apparatus, the initiating being carried out using a plurality of activation sensors of the sensor activation system, said plurality of activation sensors being provided on each side of the vehicle and being communicatively coupled to each other;

determining, with the processor, a procedure to automatically obtain information from, and information regarding a type of a tire pressure monitor system installed on the vehicle that is within the communication range based at least in part on a determination that the received vehicle data is stored in the storing module; and receiving automatically, with the processor, the information from the tire pressure monitor system installed on the vehicle that is within the communication range based at least in part on the procedure, said information including instantaneous tire pressure determined based upon the type of the tire pressure monitor system and the information received from the tire pressure sensors; and automatically displaying, using the processor, the information received from the tire pressure monitor system on a display.

10. The method of claim 9, wherein the vehicle data comprises at least one of manufacturer, make, model, and year data.

11. The method of claim 9, further comprising the step of:
linking the vehicle data of the plurality types of vehicles stored in the storing module with the received vehicle data.

12. The method of claim 9, further comprising the step of: updating the vehicle data of the plurality types of vehicles.

13. The method of claim 9, further comprising the step of:
transmitting inquiry signals to the vehicle that is within the communication range of the wheel alignment apparatus.

14. The method of claim 13, wherein the inquiry signals are transmitted based at least in part on a determination that the received vehicle data is not stored in the storing module.

15. The method of claim 13, wherein the inquiry signals are transmitted continuously at a time interval until the tire pressure monitor system of the vehicle is identified.

16. The method of claim 9, further comprising the step of: diagnosing the tire pressure monitor system.

17. The method of claim 9, further comprising:
selecting the procedure based upon the type of the tire pressure monitor system.

18. The method of claim 17, wherein said selecting is carried out upon receiving a request from the user.

19. A wheel alignment apparatus, comprising:
means for receiving configured to receive a vehicle;
means for imaging configured to capture an image of wheels of the vehicle;
means for capturing configured to receive the image of the wheels of the vehicle;
means for initiating tire pressure sensors of the vehicle when the vehicle is received by the means for receiving, said means for initiating including a plurality of activation sensors on each side of the vehicle, the plurality of activation sensors being communicatively coupled to each other, said means for initiating being rotatably placeable near the wheels of the vehicle; and
means for processing including a display configured to display the image of the wheels of the vehicle, said means for processing configured to automatically obtain information from, and information regarding a type of a tire pressure monitor system installed on the vehicle to automatically display instantaneous tire pressure information of the wheels of the vehicle based upon the type of the tire pressure monitor system when the vehicle is located within a predetermined proximity of the wheel alignment apparatus.

* * * * *